US008849880B2

(12) United States Patent
Thelen

(10) Patent No.: US 8,849,880 B2
(45) Date of Patent: Sep. 30, 2014

(54) PROVIDING A SHADOW DIRECTORY AND VIRTUAL FILES TO STORE METADATA

(75) Inventor: Greg Thelen, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 199 days.

(21) Appl. No.: 13/110,424

(22) Filed: May 18, 2011

(65) Prior Publication Data
US 2012/0296944 A1 Nov. 22, 2012

(51) Int. Cl.
G06F 17/30 (2006.01)

(52) U.S. Cl.
CPC .................................. G06F 17/30 (2013.01)
USPC ........... 707/831; 707/649; 707/655; 707/661; 707/822; 707/828

(58) Field of Classification Search
CPC ................................ G06F 17/30; G06F 17/00
See application file for complete search history.

(56) References Cited

U.S. PATENT DOCUMENTS

| 5,175,852 | A | 12/1992 | Johnson |
| 6,055,547 | A | 4/2000 | Cooper |
| 6,173,291 | B1 * | 1/2001 | Jenevein .................... 1/1 |
| 6,389,420 | B1 * | 5/2002 | Vahalia et al. ............. 1/1 |
| 6,697,846 | B1 * | 2/2004 | Soltis ...................... 709/217 |
| 6,751,637 | B1 * | 6/2004 | Hitz et al. ................. 1/1 |
| 6,782,389 | B1 * | 8/2004 | Chrin et al. ............... 1/1 |
| 6,978,284 | B2 * | 12/2005 | McBrearty et al. ......... 1/1 |
| 7,010,554 | B2 * | 3/2006 | Jiang et al. ............... 1/1 |
| 7,162,486 | B2 * | 1/2007 | Patel et al. ............... 1/1 |
| 7,293,097 | B2 | 11/2007 | Borr |
| 7,313,557 | B1 | 12/2007 | Noveck |
| 7,360,034 | B1 | 4/2008 | Muhlestein |
| 7,366,834 | B2 * | 4/2008 | McGovern et al. ........... 711/112 |
| 7,406,473 | B1 | 7/2008 | Brassow |
| 7,430,570 | B1 * | 9/2008 | Srinivasan et al. .......... 1/1 |
| 7,450,734 | B2 * | 11/2008 | Rodriguez et al. .......... 382/100 |
| 7,487,228 | B1 | 2/2009 | Preslan |
| 7,546,319 | B1 * | 6/2009 | Srinivasan et al. .......... 1/1 |
| 7,590,807 | B2 * | 9/2009 | McGovern et al. ........... 711/159 |
| 7,613,724 | B1 * | 11/2009 | Santry et al. ............. 1/1 |
| 7,620,671 | B2 * | 11/2009 | Jiang et al. ............... 1/1 |
| 7,631,148 | B2 * | 12/2009 | Fair ...................... 711/137 |
| 7,650,341 | B1 * | 1/2010 | Oratovsky et al. ......... 707/999.01 |
| 7,653,699 | B1 * | 1/2010 | Colgrove et al. ........... 709/213 |
| 7,694,191 | B1 * | 4/2010 | Bono et al. ............... 714/48 |
| 7,836,017 | B1 * | 11/2010 | Srinivasan et al. .......... 707/634 |
| 7,930,493 | B1 * | 4/2011 | McGovern et al. ........... 711/159 |
| 7,930,508 | B2 * | 4/2011 | Giampaolo ................ 711/170 |
| 7,979,416 | B1 * | 7/2011 | Santry et al. ............. 707/706 |

(Continued)

FOREIGN PATENT DOCUMENTS

JP 2009211668 9/2009

OTHER PUBLICATIONS

Haas, HPC in Science & Engineering, SBAC-PAD 2005—High Performance Computing in Science and Engineering, Oct. 2005 (15 pages).

(Continued)

Primary Examiner — Farhan Syed

(57) ABSTRACT

Metadata is stored in non-volatile storage. The metadata is associated with files in a directory. A shadow directory and virtual files that correspond to the files of the directory are formed. The virtual files contain the metadata.

19 Claims, 6 Drawing Sheets

(56) References Cited

U.S. PATENT DOCUMENTS

| | | | |
|---|---|---|---|
| 8,082,230 B1* | 12/2011 | Root | 707/661 |
| 8,086,638 B1* | 12/2011 | Stacey et al. | 707/791 |
| 8,103,639 B1* | 1/2012 | Srinivasan et al. | 707/690 |
| 8,131,782 B1* | 3/2012 | Srinivasan et al. | 707/822 |
| 8,180,747 B2* | 5/2012 | Marinkovic et al. | 707/704 |
| 8,214,404 B2* | 7/2012 | Kazar | 707/797 |
| 8,316,066 B1* | 11/2012 | Srinivasan et al. | 707/828 |
| 2002/0019874 A1 | 2/2002 | Borr | |
| 2003/0033308 A1* | 2/2003 | Patel et al. | 707/10 |
| 2003/0182332 A1* | 9/2003 | McBrearty et al. | 707/206 |
| 2003/0191745 A1* | 10/2003 | Jiang et al. | 707/2 |
| 2005/0097260 A1* | 5/2005 | McGovern et al. | 711/100 |
| 2005/0144501 A1* | 6/2005 | Kim et al. | 714/2 |
| 2005/0154825 A1* | 7/2005 | Fair | 711/113 |
| 2006/0018506 A1* | 1/2006 | Rodriguez et al. | 382/100 |
| 2006/0053157 A1* | 3/2006 | Pitts | 707/102 |
| 2006/0115108 A1* | 6/2006 | Rodriguez et al. | 382/100 |
| 2007/0038697 A1* | 2/2007 | Zimran et al. | 709/203 |
| 2007/0088702 A1* | 4/2007 | Fridella et al. | 707/10 |
| 2007/0100893 A1 | 5/2007 | Sanders | |
| 2007/0198550 A1* | 8/2007 | Irving et al. | 707/100 |
| 2007/0226320 A1* | 9/2007 | Hager et al. | 709/219 |
| 2007/0226443 A1* | 9/2007 | Giampaolo | 711/170 |
| 2009/0144342 A1* | 6/2009 | Sudhakar | 707/203 |
| 2010/0005072 A1* | 1/2010 | Pitts | 707/3 |
| 2010/0011037 A1* | 1/2010 | Kazar | 707/205 |
| 2010/0036840 A1* | 2/2010 | Pitts | 707/5 |
| 2010/0070982 A1* | 3/2010 | Pitts | 719/318 |
| 2011/0040810 A1* | 2/2011 | Kaplan et al. | 707/822 |
| 2011/0145199 A1* | 6/2011 | Prasad Palagummi | 707/654 |
| 2011/0153606 A1* | 6/2011 | Kim et al. | 707/737 |
| 2011/0196903 A1* | 8/2011 | Giampaolo | 707/822 |
| 2011/0246491 A1* | 10/2011 | Clash et al. | 707/755 |
| 2011/0320507 A1* | 12/2011 | Peleg | 707/822 |

OTHER PUBLICATIONS

Wikipedia, Network File System (Protocol) dated on or before Mar. 11, 2011 (1 page).
Wikipedia, File Descriptor dated Dec. 10, 2010 (4 pages).
Wikipedia, Server Message Block dated Mar. 9, 2011 (10 pages).
Thelen et al., Internatioanal PCT Application No. PCT/US11/39229 entitled "Cross-Protocol Locking With a File System" filed Jun. 6, 2011 (25 pages).

* cited by examiner

PROVIDING A SHADOW DIRECTORY AND VIRTUAL FILES TO STORE METADATA

BACKGROUND

Computers can use file systems to store different types of objects. Typical objects include files and directories. Directories are hierarchical arrangements of objects, and may have nested objects. Directories include files or file folders and sub-directories. File systems use storage media to store objects, such as hard drives, flash media, or other non-volatile storage.

A file system also uses and stores metadata that describes information about the file system. Such metadata is typically hidden from users (which can include applications in a computer system). The metadata describes where on the physical storage media the files are located. The storage media may be considered as a large array of bytes. However, the file system does not appear to a user or to be an array of bytes, but rather includes a hierarchy of objects such as files and directories. The mapping between the bytes in the storage media and the hierarchy of the files is described in the metadata. In other words, the metadata provides a mapping between the physical storage of the data and how the data is presented to the user. More specifically, the metadata provides a description as to where each file or portion of a file is located on the storage media. Note that while a file or directory may appear contiguous to a user, the file as stored on the storage media may be located in many different areas. Ideally, a file would be physically stored in a contiguous manner.

BRIEF DESCRIPTION OF THE DRAWINGS

Some embodiments are described with respect to the following figures.

DETAILED DESCRIPTION

Figure 1:
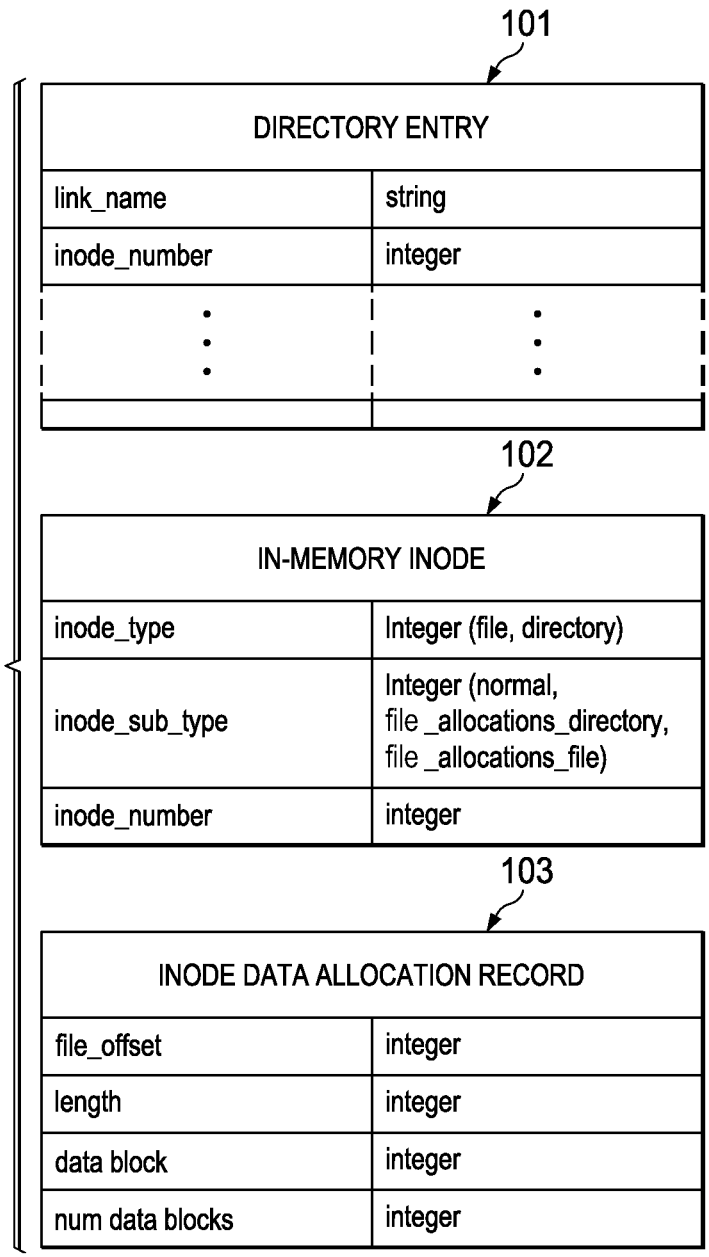
FIG. 1 depicts file structures used by some implementations.

A user (e.g., an application or any other entity capable of accessing data of a storage system) may access metadata associated with files in a file system for various purposes. For example, a defragmentation utility accesses metadata of a file to determine whether performance can be enhanced by defragmenting the storage media. When a file is first stored, the file portions may be located contiguously on the storage media. Over time, as the file is used, the file may expand or have portions deleted, and the portions of the file may become dispersed across the storage media. As a result, the file may no longer be contiguous.

Reading a file from storage media takes time, and the more discontiguous the file, the more time it takes to load the file. Thus, performance is reduced as a result of fragmented storage. Furthermore, the more fragmented the file, the more metadata that has to be used to describe the locations of the portions of the file, which consumes more space on the storage media. By examining the metadata, a defragmentation utility can determine whether efficiency can be increased by defragmenting files on the storage media. As another example, a backup utility may access metadata to determine locations of portions of a file, so that the backup utility efficiency in performing a backup process; for example, the backup process can use the information in the metadata to back up only the portions that hold relevant data. This would increase the speed of the backup process and use less space for backup storage as regions of sparse space can be ignored.

Typical operating systems use application-specific extensions in their operations, which are non-industry-standard features, to access metadata. More specifically a programming interface is used to access the file system to perform file system operations, e.g. to open a file, read a file, write portions of file, etc., which constitute a small set of actions that can be performed on files. One example of a command to access metadata is ioctl or input-output control. This command is used to pass in an opcode that is used to indicate the desired action as a sub-activity that uses specific parameters. Programmers use ioctl as a way of having file systems and operating systems perform non-standard operations. Ioctl has been used to expose and retrieve metadata from file systems.

However, ioctl is operating system specific, and thus is different for each operating system. Therefore, retrieving metadata from different systems involves different ioctl commands for the respective systems. Furthermore, the information retrieved using each different ioctl may be different as well. Such issue may not be problematic for single system devices, such as smart phones, laptops or desktops, in which a single ioctl can be used. However, this can present problems for larger systems, e.g. a networked system, where different components of the system may use different operating systems and/or different file systems, which may involve use of different ioctls. This can render accessing metadata over a networked system difficult.

Some implementations, as described herein, do not use ioctls to view metadata about the file system. Instead, virtual files containing metadata are used instead. A virtual file is a file that a user did not request to be created and the user typically would not be able to view. Utilities or other users that operate on files are able to access metadata in virtual files using certain mechanisms. For example, if a UNIX operating system is used, there is a concatenate function or cat, which concatenates data, and can be used to open a file and display data. Thus, in some implementations, cat can be used to view metadata stored in a virtual file and can be used to display any data that the file system chose or was ordered to export to a virtual file. One type of information that can be exported in such a manner is file allocation data (metadata). The file allocation data describes the physical location of files stored on a physical storage media.

In accordance with some implementations, a virtual file (also referred to as a "shadow file") is stored within each directory, where the virtual file is used to hold metadata about the directory. For every directory x, there is a shadow directory within directory x. The shadow directory may also be called a file allocation directory or virtual file allocation directory. The shadow directory has one or more virtual files that correspond to one or more files in the directory x (there can be a one-to-one correspondence between the virtual files and the actual files in the directory x). The names of the virtual files may correspond with the names of the files in directory x.

The (actual) files in directory x contain data placed in the files by the owner or user. The data in the virtual files is created by the file system. Such data in the virtual files can include file allocation metadata about each of the files in directory x. Collectively, the metadata describes a file allocation hierarchy of a file system. The shadow directory and virtual files may be stored on volatile memory and thus reduce consumption of non-volatile memory space (e.g., disk-based storage space). The shadow directories and respective virtual files form a virtual layout that corresponds to (e.g., mirrors) the respective file allocation hierarchy of the file system.

The shadow directory and virtual files provide a conduit that the file system can use to expose information about the directory x and its files to utilities or other users. Examples of utilities include a cat command, read command, or other utility. The information in the shadow directory may include text files or human readable language files, for example, text files describing the file allocation for each of the files in the directory. A virtual file would have the information that corresponds to the actual file located in directory x, such as location and size on the media.

Note that a single operating system may have multiple file systems and would be able to communicate with each different file system concurrently. For example, a Windows® operating system may have a FAT file system, a NTFS file system, and/or a CD ROM file system.

Note that other file information can be stored into shadow directories, such as file ownership information, file backup information, file usage information, file security information or other file handling data. Further note that the shadow directories and virtual files may be hidden from users; this would simplify presentation of the real directories and files, as well as prevent other utilities from operating on the virtual files. Thus, search indexers, search applications, and backup application would not operate on the virtual files. However, in alternative implementations, the shadow directories and virtual files may be visible to users.

Figure 2:
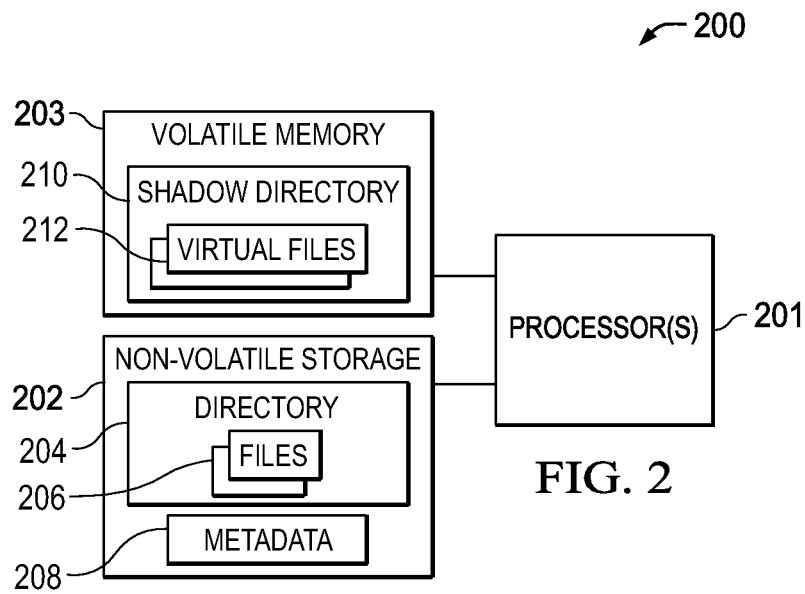
FIG. 2 depicts an example of a computer that operates according to some implementations.

FIG. 2 depicts an example of a computer 200 (or other system) that operates using some implementations described herein. Note that the computer 200 has been simplified for the sake of brevity. The computer 200 includes one or multiple processor(s) 201 that is (are) operative to execute instructions. The computer includes at least two types of storage, namely non-volatile storage 202, e.g. a hard-drive or other medium that maintains persistent data, and volatile memory 203, typically random access memory (RAM).

The non-volatile storage 202 contains a directory that has one or multiple actual files 206 that contain data. Also, metadata 208 can also be stored in the non-volatile storage 202. The metadata 208 is associated with the directory 204 and files 206. Although just one directory 204 is shown in FIG. 2, it is noted that in alternative examples, the non-volatile storage 202 can store multiple directories. The directories 204 and files 206 are file system entities associated with a file system implemented in the computer 200. The computer 200 allows access (read, write, delete, create, etc.) of the data (directory 204 and files 206), e.g., by a user, or an application executing on the computer 200. The processor 201, in accessing the data on the non-volatile storage 202, makes use of the volatile memory 203 to temporarily store information. Thus, in typically operations, the data is moved or copied to the volatile memory 203 for manipulation, and then moved or written onto the non-volatile storage 202 for more permanent storage.

In accordance with some implementations, the volatile memory 203 can also be used to store a shadow directory 210 that corresponds to the actual directory 204. In addition, the shadow directory 210 contains virtual files 212 that correspond to the actual files 206 of the directory 204.

In the ensuing discussion, reference is made to RAM (a type of volatile memory) and disk (a type of non-volatile storage). However, it should be understood that techniques or mechanisms according to some implementations can be applied with other types of storage.

FIG. 1 depicts file structures according to some examples. Such structures may be stored in the RAM 203 and/or disk 202 of FIG. 2. Such structures can also be created and/or manipulated by the processor 201 of FIG. 2. Although specific example data structures are described in connection with FIG. 1, note that in alternative examples, the data structures can have other arrangements.

The data structures include a directory entry 101. A directory is a collection of objects, such as files, subdirectories, and other objects, such as sockets. Thus, a directory is logically a collection of directory entries. Each directory entry has at least two characteristics. One characteristic is a name, e.g. link_name, which is a string. The other characteristic is an inode number, e.g. inode_number, which is an integer. The inode number is distinct for each object, and is an internal address that is used by the file system. The inode number may be directly translatable to a disk address, or another structure may be used to convert an inode number into a disk address. Thus, a directory is a list of directory entries, and each directory entry includes a link name and an inode number. Note that there may be more than one file system in a computer, and each file system may store data on disk differently.

FIG. 1 further depicts an in-memory inode 102. Objects that are stored by a file system are known as inodes. Each inode 102 has at least three characteristics. One characteristic is a type, e.g. inode_type, and is expressed by a integer, which indicates that the type is either a file or directory. Another characteristic is a sub-type, e.g. inode_sub_type, and is expressed by an integer that indicates whether the sub-type is normal, file allocations directory, or file allocations file. The inode subtype field thus indicates whether the respective inode is a normal type of file system entity (e.g., actual file or actual directory) or whether the inode is a file allocations directory (shadow directory) or a file allocations file (a virtual file contained in a shadow directory). The third characteristic is inode number, and is expressed by an integer. The in-memory inode 102 is stored in RAM; if stored on non-volatile storage 202, the inode may have a different arrangement. For example the inode number may not have to be stored on the non-volatile storage 202; rather, the inode number may be derived from the location on disk.

FIG. 1 further depicts an inode data allocation record 103. This structure is an example of metadata. Data objects are stored on disk at one or more contiguous locations. The record 103 is used to identify or describe the locations of each piece of the object. The record 103 may only identify or describe a subset of an object. Multiple, different records 103 may have to be used to describe an entire file. The record 103 includes a file offset value, length, data block, and num data block values that are expressed as integers. The file offset value indicates the starting portion of the file described by the record 103. The length value describes the length of the portion of the object described by the record 103. These two values together indicate the region of the object described by the record 103. The data block value is an address or disk location where that part of the file can be found. The num data blocks value indicates how many blocks on disk starting at data block value contain the data that is associated with the object identified by the file offset value. Note that file offset is an index into a object's logical byte string or file space, while data block is an address within the storage device address space. The inode is queried using FIG. 7 (discussed below) to retrieve the zero or more records 103 that describe an entire file.

At a high-level, a file system is a hierarchy of directories and files. The hierarchy is described by directory entries. The root directory, or top directory, is a directory, but itself is actually stored as an inode. Thus, everything stored on disk is stored as an inode of some type, including directories, and the files that are hierarchically portions of the directories. Directory entries 101 allow location of the inodes 102 by name. Using the inode number of an inode 102, an associated data allocation record 103 can be found, and the metadata stored therein can be reviewed and/or manipulated.

Figure 3:
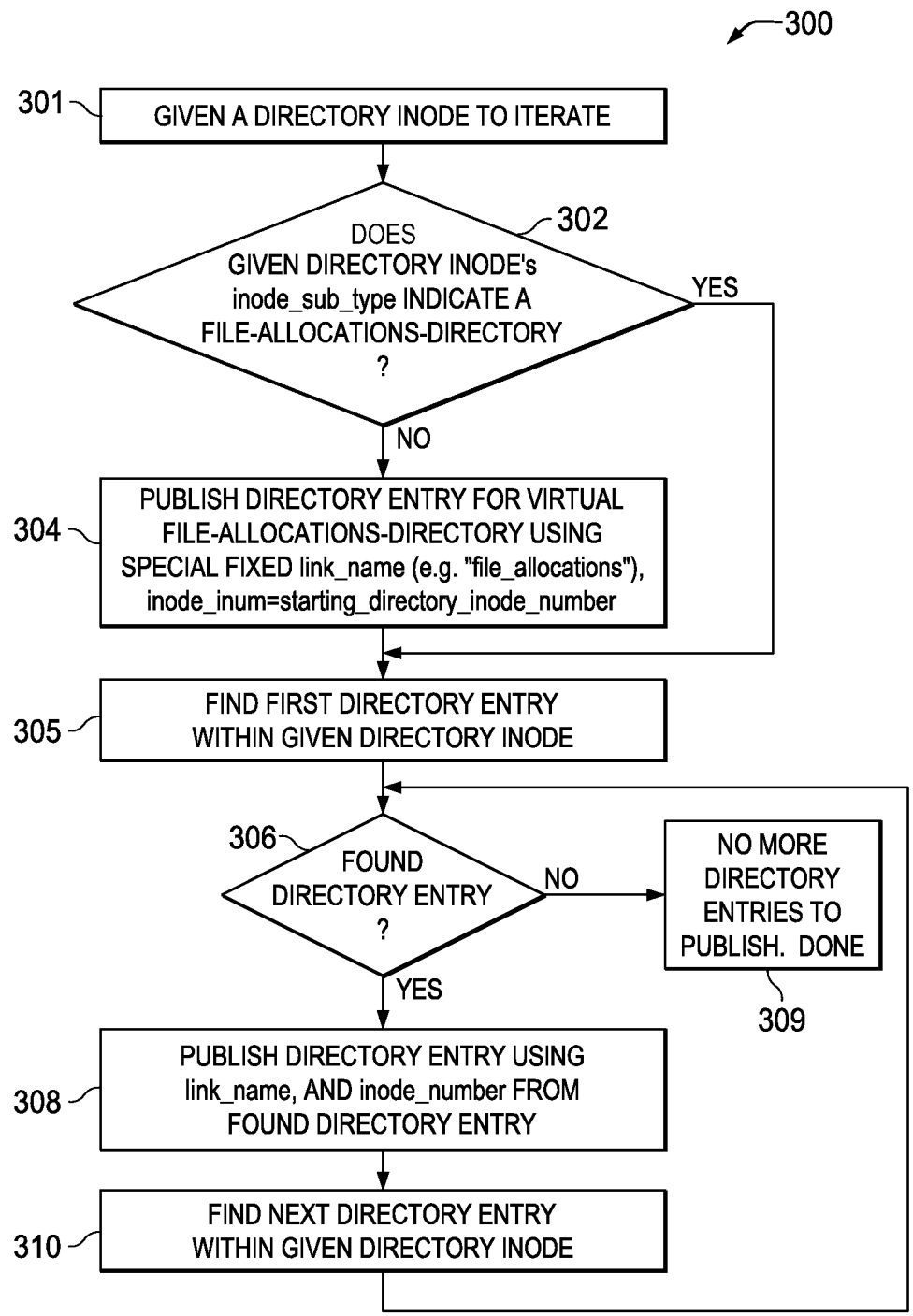
FIG. 3 depicts an example of a process that enumerates the contents of a directory according to some implementations.

FIG. 3 depicts an example of a process 300 that enumerates the contents of a directory for creating a shadow directory (file allocation directory). In other words, FIG. 3 depicts a read directory or read dir process. In box 301, the process begins with a given directory. In diamond 302, the process determines whether a given directory's inode sub-type (contained in the in-memory inode 102 of FIG. 1) indicates a file allocation directory (shadow directory). In other words, box 302 determines whether the given directory is a file allocations directory by checking the inode sub-type. In most instances, the no path is followed to block 304 (for processing a directory that is not a shadow directory—in other words, the directory is an actual directory). If the directory is a file allocations directory, the process proceeds to box 305 and skips box 304.

In box 304, a directory entry is published for a virtual file allocations directory. The entry is published into the RAM, and this begins the creation of the shadow directory that mirrors the real directory. The entry is assigned the same inode value as the inode directory. Thus, if the directory or object is not a file allocation directory, then box 304 creates a virtual file allocation directory.

In box 305, the process locates the first directory entry within the given directory inode. In diamond 306, since a directory can be empty, the process determines whether the directory has any contents. If empty, the process moves to box 309 and the process is done. If the directory is not empty, after finding the first entry in diamond 306, the process moves to box 308 by the yes path and publishes the directory entry in the virtual file allocation directory (shadow directory) using the link name and inode number from the found directory. The process then proceeds to box 310, where the process finds the next directory entry within the given inode and returns to diamond 306 to determine if it empty. The process loops through boxes 306, 308, and 310 until all entries have been published, at which point the process completes at 309.

Note that box 304 creates the virtual directory, and boxes 305 and 308 write items into the virtual file allocation directory. Boxes 305 and 310 examine the nonvolatile memory, while boxes 304 and 308 access the RAM. Thus, the process 300 of FIG. 3 may be considered as making a list of files in a directory. Note that the files themselves can be other directories.

Figure 4:
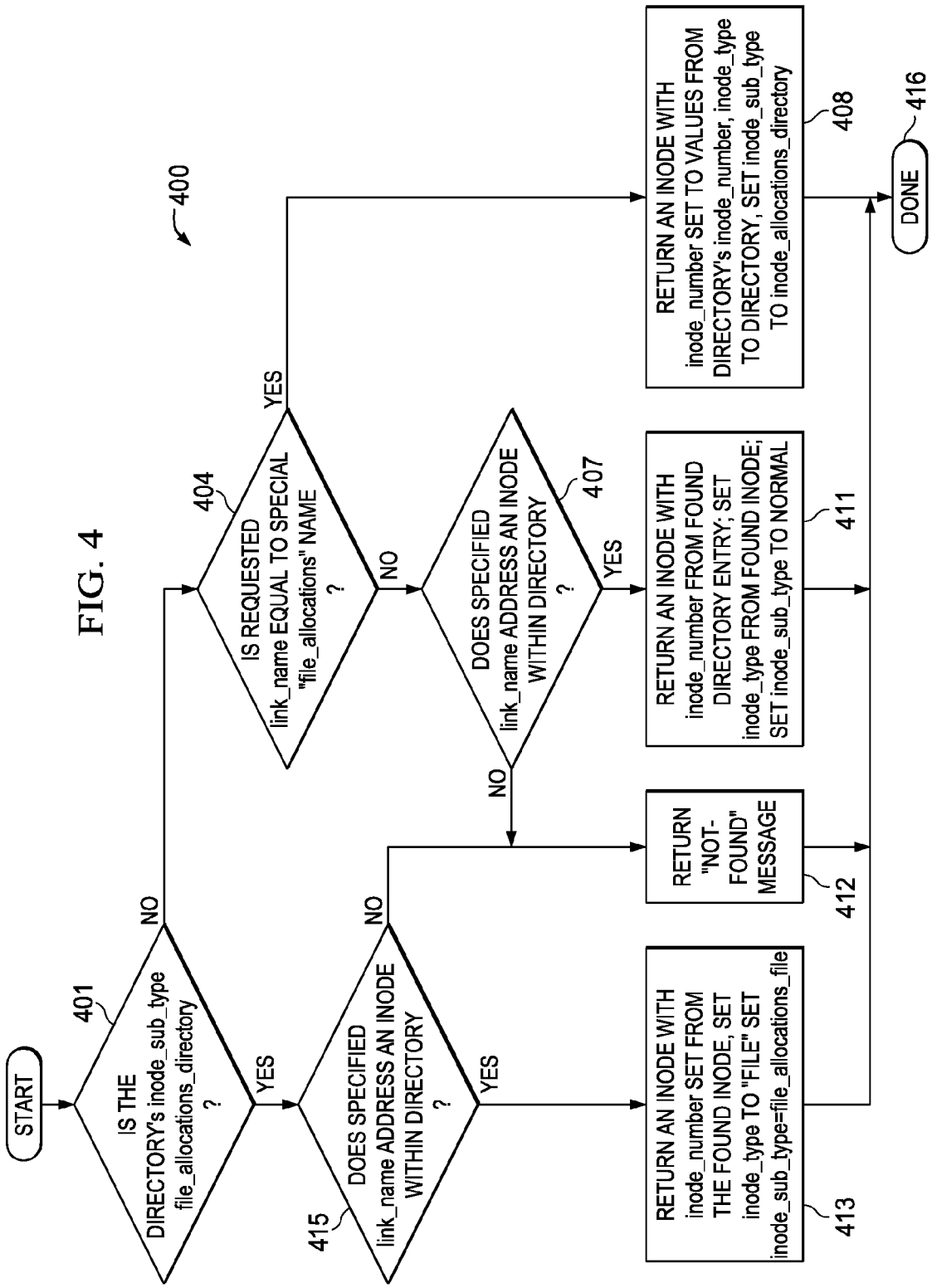
FIG. 4 depicts a process that converts a file name into an in memory inode according to some implementations.

FIG. 4 depicts a process 400 that converts a file name into an in-memory inode. The process is useful for file manipulation such as read, write, or delete of a particular file in the directory. The process 300 of FIG. 3 can be used to produce the name of a file, but does not produce inodes. The in-memory inode can then be used in manipulation of the file. Note that this process can be used for either real files and directories or virtual files and directories.

Diamond 401 determines whether the type of the directory is a normal type directory or is a special type, namely the file allocations directory type. In other words, diamond 401 determines if the directory is a data directory, or a file allocations directory (shadow directory). In most instances, the no path will be followed. Only if the directory is a file allocations directory will the yes path be followed.

Following the no path, diamond 404 determines if the link name is "file allocations". Typically, the name is not "file allocations", so the no so path is followed by the process. However, if the link name is "file allocations", the yes path is followed to box 408. In box 408, the process returns an inode with the inode number set to the value of the starting directory's inode number. In other words, box 408 creates an in-memory inode 102 of FIG. 1, and box 408 assigns particular values to the created inode. Box 408 sets the inode number to that of the directory passed into this process, sets the inode type to directory, and the sub-type to file allocations directory. The process then moves to the box 416, where the process is done. Thus, this process operates such that if the directory does not have the sub-type of file allocations directory, but has the name "file allocations", then the process forms a new in-memory inode. This process results in two directory inodes, one data directory inode and one file allocations directory inode. The file allocations directory is a sub-directory of the data directory. This file allocations directory (shadow directory) can then be passed into the read dir process 300 to enumerate the contents of the file allocations directory.

Returning to diamond 404, if the file name is not equal to "file allocations", but rather a normal name, then the yes path is followed to diamond 407. Note that this path indicates that the directory is a normal non-virtual directory. In diamond 407, the process examines the disk to determine if the given link name exists within the directory handed in at the process. If the given link name does not exist, the process follows the no path to box 412, which returns a not found message and the process is done at box 416. If the given link name does exist, box 407 follows the yes path to box 411. Box 411 produces an inode based upon the data found. Note that this is not virtual information. Box 411 forms an inode in volatile memory and sets the inode number, which is discovered by box 407 during its query. Box 411 sets the sub-type field in the in-memory inode 102 of FIG. 1 to normal and proceeds to box 416 (done). The result of box 411 is an inode that has the number that was found on disk.

Returning to diamond 401, and proceeding down the yes path, which indicates that the sub-type of the inode is a file allocations directory, the process then proceeds to diamond 415. Note that this process is searching for a particular named object, so this path is followed if the object is the file allocations directory. Diamond 415 performs a similar determination as in diamond 407, which is a determination of whether an inode exists within a directory on the disk indicated by the link name address. If it does not exist, then the process follows the no path to the box 412. If the inode does exist, the process follows the yes path to box 413 where it creates an inode with sub-type set to file_allocations_file. Again, this process is attempting to search within a directory for particular named object. If the starting directory is a virtual file allocations directory, then the created inode will contain metadata associated with the disk inode.

Thus, a directory can have two different types of inodes. One type is the normal inode returned by box 411, and the other type is the metadata inode returned by box 413. Note that in box 413 the sub-type is set to file allocation file. This sub-type indicates that it is a virtual file, so for later processing the sub-type field is examined to determine whether the inode contains metadata. Further note that in box 413 the sub-type is file whereas in box 408 the sub-type is directory.

This allows a hierarchy of virtual files to be built, where the file inode allocations directory is the shadow directory having virtual files residing within the shadow directory.

The process 400 of FIG. 4 can be repeated for each file within a directory on disk. The result would be a shadow directory in volatile memory, that mirrors the disk directory and includes an additional directory called file allocations directory. The file allocations directory includes virtual files that mirror the hard disk files in structure, but contain metadata (rather than actual data) about their associated hard disk files.

Figure 6:
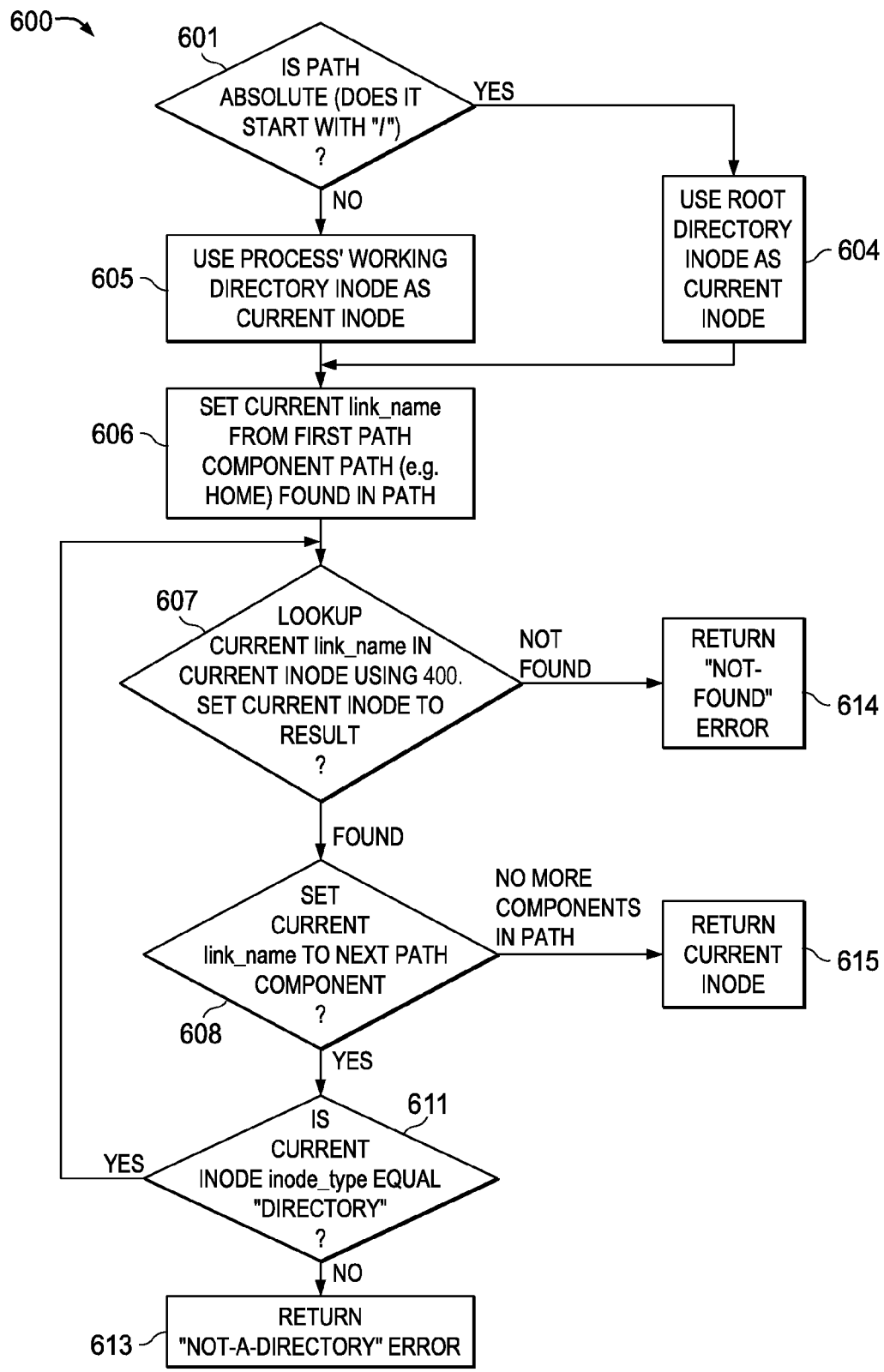
FIG. 6 depicts a process that uses a hierarchical string to locate a particular file according to some implementations.

FIG. 6 depicts a process 600 where a string is used to open a particular file. The string identifies the hierarchy used to locate the file. The string may be created by a user, application, or a program. An example of a string may be "/home/year/month/day/hour/report.txt." In this string, report.txt is the file, while home, year, month, day and hour are directories. In diamond 601, the process examines the string and determines whether or not it starts with a slash ("/"). If it begins with a slash, then the yes path is followed to box 604. This type of string is known as an absolute pathname. In box 604, the process uses the root directory inode is the current inode.

If the string does not begin with a slash, the string is known as a relative path, which means that the string does not start with the top of the file system, but rather it begins at a location in the application the call originated from. This location is known as the current working directory. Thus, in box 605, the working directory inode is used as the current inode. In other words, box 601 determines the start of the search, i.e. the root (or top) directory or the current working directory.

In any event, boxes 604 and 605 both proceed to box 606. In box 606, the process sets the current name from the first path component found in the string path. In diamond 607, the process looks up the current link name in the current inode using the process 400 of FIG. 4. The inode returned by process 400 is used to set the value of the current inode. If there was nothing found in the lookup, the process moves to box 614, which indicates a "non-found" error. In most instances, the lookup will find an inode and the process proceeds to diamond 608.

In diamond 608, the process sets the link name to the next path component of the string. If there are more components, the process moves along the yes path to diamond 611. Diamond 611 determines if the current inode has the type "directory". If it does not, the process returns "not-a-directory" error in box 613. In most instances, what is found is a directory and the yes path is followed back to diamond 607. This check is just in case the link name is a file and not a directory. If the name is a directory, then items may be contained within a directory, but if the name is a file, then in a file system hierarchy there is nothing to look for below a file. So this process continues back through 607 and 608 until there are no more components. If there are no more path components of the string, then the process proceeds to box 615 and returns the current inode.

The process 600 can be used to return the metadata for a virtual file. If an application in interested in the metadata associated with a particular file, then this process 600 can be used to locate the inode that has the metadata that is associated with the particular file.

Figure 5:
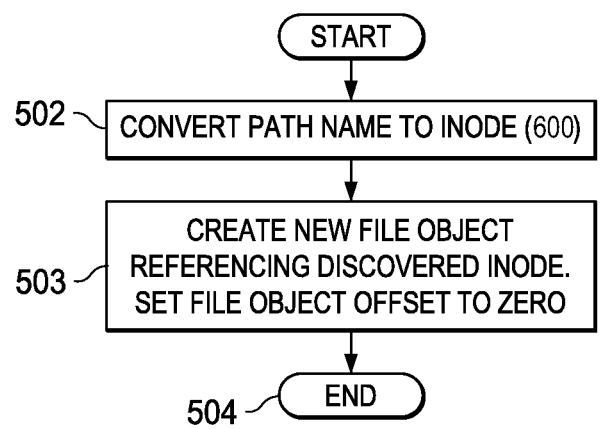
FIG. 5 depicts an open operation being performed on a file system object to allow for further manipulation, according to some implementations.

FIG. 5 depicts an open operation being performed on a file system object to allow for further manipulation. An example flow would be to use the read dir process 300 of FIG. 3 and the pathname-to-inode process 600 of FIG. 6 to return a desired inode. This flow would allow a requestor to determine the contents of a file system (or portion thereof) and locate handles to the files and directories that exist within the file system (or portion thereof). Note that this flow would operate for both normal file systems and the virtual file systems.

Opening a particular object allows the object to be further manipulated, such as in response to a read, write, delete, etc. Thus, if a requestor performed an open command on an object, the application would issue a command such as open, and would include a string of a desired object. Thus, looking for a particular file allocation data for particular file would result in an inode being created using box 413 (FIG. 4) and this inode would contain metadata.

In box 502, the process converts the path to the inode by using the process 600 of FIG. 6. In box 503, the process creates a new file object referencing the inode from box 502. The created file object has two fields, namely the inode number and the file offset indicator. The offset is used in file manipulation. The process of FIG. 5 ends at 504.

Figure 7:
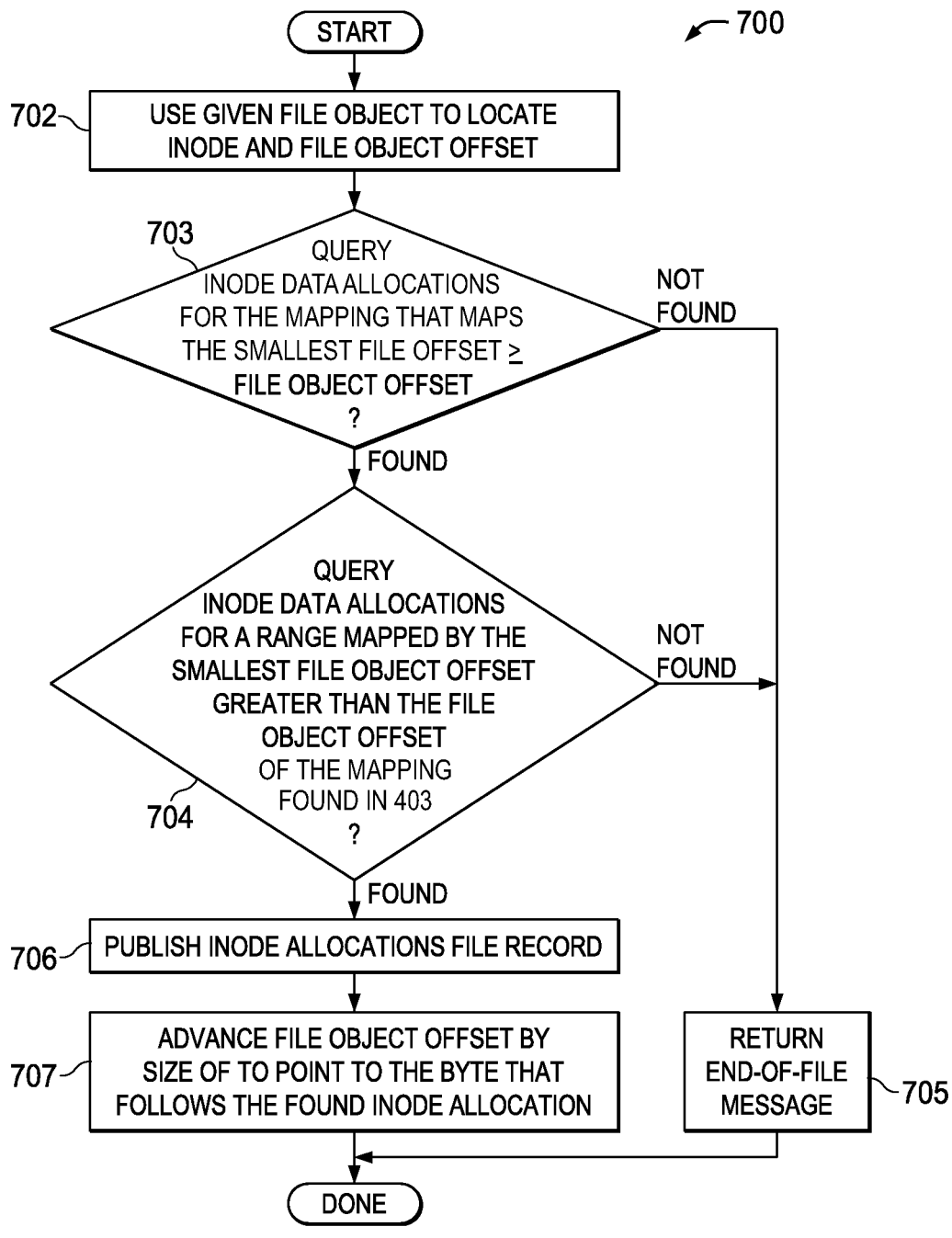
FIG. 7 depicts a process to read a file, according to some implementations.

FIG. 7 depicts a process 700 to read a file allocation file (virtual file) (such as in response to a read system call). In FIG. 7, the process 700 assumes that the file has already been opened, for example by the process of FIG. 5.

In box 702, the process is given the file object from box 503 of FIG. 5, and the file object offset, which has been initially set to zero. The process proceeds to diamond 703, where the process determines if the file offset is mapped by any inode data allocations for this inode. The inode data allocations is logically a table and is a list of zero or more allocation records that describe what parts of the object's private address space is mapped and where it is mapped on disk. A file may be tightly packed. For example, if there is 3 bytes in the file, they are located at offsets 0, 1, and 2. This example has one file allocation structure that indicates a length of 3 at certain a disk address. The file may be fragmented, where data is scattered on the disk. In the 3-byte example, each of the three bytes may be located at three different locations having different disk addresses. In this case there will be three records, one for each location.

Diamond 703 queries the inode data allocations for the mapping that maps the smallest file offset that is greater than or equal to the file object offset provided by box 702. If the mapping is found, then the process proceeds to diamond 704, where the process queries the inode data allocations for a range mapped by the smallest file object offset greater than the file object offset of the mapping found in box 703. If this range is found, then valid data exists, the metadata for the data at the offset is published in box 706.

Next, in box 707, the offset is advanced by the amount determined in diamond 704. After box 707, the process may return to box 702, using the advanced offset, to publish the metadata of the next allocation record. If nothing is found by diamond 703 or 704, then the end of the file has been reached (box 705 returns an "end-of-file" message), and the process is done.

Note that FIG. 7 depicts a read operation, but another operation can be used. For example, a write operation would have a similar flow, but instead reading from an offset, the process would inject data in the memory location described by the offset. Further note, that the implementations described herein are defined in terms of file allocation metadata, however other types of metadata could be used, for example, time of last backup.

Machine-readable instructions of modules for performing the tasks of FIGS. 3-7 are executed on a processor or processors (such as 201 in FIG. 2). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A system comprising:
    a non-volatile storage to store a particular directory having files that contain data, wherein the non-volatile storage is to further store metadata associated with the files;
    at least one processor to form a shadow directory and virtual files that correspond to the files of the particular directory, wherein the virtual files contain a copy of the metadata; and
    a volatile memory to store the shadow directory and the virtual files,
    wherein the at least one processor is to form an inode data structure for storing on the volatile memory, wherein the inode data structure comprises:
        an inode type field that indicates that the inode data structure represents one of a file and a directory, and
        a sub-type field that indicates a type of an object represented by the inode data structure, wherein the sub-type field is settable to a first value to indicate that the object is a shadow directory, and to another value to indicate that the object is another type,
    wherein the at least one processor is to:
        determine, by accessing the sub-type field in the inode data structure, that a given object represented by the inode data structure is the shadow directory, based on detecting the sub-type field set to the first value, and
        determine, by accessing the inode type field in the inode data structure, that the given object is a directory, based on detecting the inode type field set to a value indicating a directory.

2. The system of claim 1:
    wherein the shadow directory corresponds to the particular directory, and wherein the virtual files contain a copy of the metadata without storing the data of the files of the particular directory.

3. The system of claim 2, wherein the metadata describes a file allocation of the data on the non-volatile memory.

4. The system of claim 1, wherein the inode data structure further comprises:
    an inode number field that indicates an identity of the inode data structure and is useable to locate a record data structure.

5. The system of claim 4, wherein the record data structure comprises information describing locations of each piece of the object.

6. The system of claim 2, further comprising an application to access the shadow directory to retrieve the metadata.

7. The system of claim 6, wherein the application is associated with a different file system than a file system that contains the particular directory.

8. The system of claim 2, wherein the shadow directory is part of the particular directory.

9. A method comprising:
    storing metadata in non-volatile storage, wherein the metadata describes a hierarchical arrangement of directories and files containing data;
    creating, by a system including a processor, shadow directories corresponding to the directories of the hierarchical arrangement, wherein each of the shadow directories includes virtual files corresponding to respective files containing data, wherein each of the virtual files contains metadata corresponding to the respective file containing data;
    forming, by the system, an inode data structure for storing on volatile memory, wherein the inode data structure comprises an inode type field settable to a first value to indicate that the inode data structure represents a directory, and to a second value to indicate that the inode data structure represents a file, and the inode data structure further comprising a sub-type field that indicates a type of an object represented by the inode data structure, wherein the sub-type field is settable to one value to indicate that the object is a shadow directory, and to another value to indicate that the object is another type;
    determining, by accessing the sub-type field in the inode data structure, that a given object represented by the inode data structure is one of the shadow directories, based on detecting the sub-type field set to the one value; and
    determining, by accessing the inode type field in the inode data structure, that the given object is a directory, based on detecting the inode type field set to the first value.

10. The method of claim 9, wherein each of the shadow directories is part of a respective directory of the hierarchical arrangement.

11. The method of claim 9, further comprising storing the shadow directories and the virtual files in volatile memory.

12. The method of claim 9, wherein the metadata describes a file allocation hierarchy, and wherein creating the shadow directories and virtual files are part of forming a virtual layout that corresponds to the file allocation hierarchy, wherein the shadow directories are not part of the file allocation hierarchy.

13. The method of claim 12, further comprising:
    providing a plurality of inodes for the virtual layout with one inode being associated with each object of the layout, wherein the plurality of inodes are stored in the volatile memory;
    locating a particular inode of the plurality of inodes, wherein the particular inode stores a portion of the metadata; and
    reading the portion of the metadata associated of the particular inode.

14. The method of claim 13, wherein the locating comprises:
moving through a path name string by moving through inodes until a file type inode is located; and
returning the file type inode as the particular inode.

15. The method of claim 12, wherein the forming the virtual layout comprises:
publishing an entry in the virtual layout for a directory object of the file allocations hierarchy having a name that identifies the published entry as a file allocations directory.

16. An article comprising at least one non-transitory machine-readable storage medium storing instructions that upon execution cause a system to:
store metadata in non-volatile storage, wherein the metadata describes a hierarchical arrangement of directories and files containing data;
create shadow directories corresponding to the directories of the hierarchical arrangement, wherein each of the shadow directories includes virtual files corresponding to respective files containing data, wherein each of the virtual files contains metadata corresponding to the respective file containing data;
form an inode data structure for storing on volatile memory, wherein the inode data structure comprises:
an inode type field that indicates that the inode data structure represents one of a file and a directory, and
a sub-type field that indicates a type of an object represented by the inode data structure, wherein the sub-type field is settable to a first value to indicate that the object is a shadow directory, and to another value to indicate that the object is another type;
determine, by accessing the sub-type field in the inode data structure, that a given object represented by the inode data structure is one of the shadow directories, based on detecting the sub-type field set to the first value; and
determine, by accessing the inode type field in the inode data structure, that the given object is a directory, based on detecting the inode type field set to a value indicating a directory.

17. The method of claim 9, wherein each of the virtual files contains the metadata corresponding to the respective file containing data, without storing the data of the respective file containing data.

18. The article of claim 16, wherein each of the virtual files contains the metadata corresponding to the respective file containing data, without storing the data of the respective file containing data.

19. The method of claim 9, wherein the Mode type field in the Mode data structure is distinct from the sub-type field in the Mode data structure.

* * * * *

UNITED STATES PATENT AND TRADEMARK OFFICE
CERTIFICATE OF CORRECTION

PATENT NO.        : 8,849,880 B2                                    Page 1 of 1
APPLICATION NO.   : 13/110424
DATED             : September 30, 2014
INVENTOR(S)       : Greg Thelen It is certified that error appears in the above-identified patent and that said Letters Patent is hereby corrected as shown below:

In the Claims

In column 12, line 23, in Claim 19, delete "Mode" and insert -- inode --, therefor.

In column 12, line 24, in Claim 19, delete "Mode" and insert -- inode --, therefor.

In column 12, line 25, in Claim 19, delete "Mode" and insert -- inode --, therefor.

Signed and Sealed this
Tenth Day of February, 2015

Michelle K. Lee
*Deputy Director of the United States Patent and Trademark Office*